（12） United States Patent
Rogas

(10) Patent No.: US 10,552,838 B2
(45) Date of Patent: Feb. 4, 2020

(54) SYSTEM AND METHOD FOR EVALUATING FRAUD IN ONLINE TRANSACTIONS

(71) Applicant: NS8, Inc., Las Vegas, NV (US)

(72) Inventor: Adam Rogas, Las Vegas, NV (US)

(73) Assignee: NS8, Inc., Las Vegas, NV (US)

( * ) Notice: Subject to any disclaimer, the term of this patent is extended or adjusted under 35 U.S.C. 154(b) by 118 days.

(21) Appl. No.: 15/793,937

(22) Filed: Oct. 25, 2017

(65) Prior Publication Data

US 2018/0108015 A1    Apr. 19, 2018

Related U.S. Application Data

(63) Continuation-in-part of application No. 15/701,375, filed on Sep. 11, 2017.

(Continued)

(51) Int. Cl.
| | |
|---|---|
| H04L 29/00 | (2006.01) |
| G06Q 20/40 | (2012.01) |
| H04L 29/12 | (2006.01) |
| H04W 4/02 | (2018.01) |
| G06F 9/44 | (2018.01) |
| G06F 16/955 | (2019.01) |
| G06F 16/958 | (2019.01) |
| H04L 29/06 | (2006.01) |
| H04W 4/029 | (2018.01) |

(52) U.S. Cl.
CPC .......... *G06Q 20/4016* (2013.01); *G06F 9/44* (2013.01); *G06F 16/955* (2019.01); *G06F 16/986* (2019.01); *H04L 61/1511* (2013.01); *H04L 61/2503* (2013.01); *H04L 61/609* (2013.01); *H04W 4/027* (2013.01); *H04L 63/1408* (2013.01); *H04W 4/029* (2018.02)

(58) Field of Classification Search
CPC ............ G06Q 20/4016; H04L 63/1408; H04L 61/1511; H04L 61/2503; H04L 61/609; H04L 61/1552; G06F 9/44; G06F 17/30896; G06F 17/30876; G06F 16/955; G06F 16/986; H04W 4/027; H04W 4/028; H04W 4/029; H04W 12/00503; H04W 12/00508
See application file for complete search history.

(56) References Cited

U.S. PATENT DOCUMENTS 8,505,071 B2    8/2013   Fritz et al.
9,071,576 B1    6/2015   Earl et al.
(Continued)

*Primary Examiner* — Don G Zhao
(74) *Attorney, Agent, or Firm* — Weide & Miller, Ltd.

(57) ABSTRACT

Systems and methods for evaluating trustworthiness for an online transaction are provided. The methods may include providing a detection script to a user device alongside content requested by the user device. The detection script is executable on a web browser or web-based application of the user device and configured to cause the user device to send feedback from at least one sensor on the user device that is accessible by the web browser or web-based application. The system receives the feedback from the user device at a server and evaluates the feedback from the at least one sensor on the user device. The script further allows the server to obtain location information for the user device. The server calculates a trustworthiness factor for the user device based on the obtained feedback and location for the user device.

20 Claims, 7 Drawing Sheets

Related U.S. Application Data

(60) Provisional application No. 62/412,513, filed on Oct. 25, 2016, provisional application No. 62/385,894, filed on Sep. 9, 2016.

(56) References Cited

U.S. PATENT DOCUMENTS

| | | |
|---|---|---|
| 9,118,680 B1 | 8/2015 | Dunlap et al. |
| 9,582,802 B2 * | 2/2017 | Bachenheimer ...... G06Q 20/4016 |
| 9,906,544 B1 | 2/2018 | Kurupati |
| 2006/0190603 A1 | 8/2006 | Anzai et al. |
| 2008/0307085 A1 | 12/2008 | Curran et al. |
| 2009/0055910 A1 | 2/2009 | Lee |
| 2009/0094687 A1 | 4/2009 | Jastrebski et al. |
| 2011/0153840 A1 | 6/2011 | Narayana et al. |
| 2012/0254940 A1 | 10/2012 | Raper |
| 2013/0007100 A1 | 1/2013 | Trahan et al. |
| 2013/0074169 A1 * | 3/2013 | Nuzzi ............... G06F 21/6209 726/7 |
| 2013/0159804 A1 * | 6/2013 | Suzue ................ H04L 67/22 714/746 |
| 2013/0185143 A1 * | 7/2013 | Damman ............ G06F 16/907 705/14.41 |
| 2013/0198821 A1 | 8/2013 | Hitchcock et al. |
| 2013/0246187 A1 * | 9/2013 | Chau ................. G06Q 30/0222 705/14.66 |
| 2013/0276125 A1 | 10/2013 | Bailey |
| 2014/0013389 A1 | 1/2014 | Han et al. |
| 2014/0137192 A1 | 5/2014 | Arroyo-Figueroa |
| 2014/0150095 A1 | 5/2014 | Zhao et al. |
| 2014/0236695 A1 * | 8/2014 | Shvarts ............. G06Q 30/0224 705/14.25 |
| 2014/0331283 A1 | 11/2014 | Stein et al. |
| 2014/0349692 A1 * | 11/2014 | Zhou ................. G06Q 20/3829 455/466 |
| 2014/0359730 A1 | 12/2014 | Hang et al. |
| 2014/0380418 A1 | 12/2014 | Wang |
| 2015/0082460 A1 | 3/2015 | Amiga |
| 2015/0215334 A1 | 7/2015 | Bingham et al. |
| 2015/0220928 A1 * | 8/2015 | Allen ................ G06Q 20/0655 705/67 |
| 2015/0269380 A1 * | 9/2015 | Golovanov ........... G06F 21/562 726/24 |
| 2015/0276421 A1 * | 10/2015 | Beaurepaire ......... H04W 4/027 701/400 |
| 2016/0078446 A1 * | 3/2016 | Trostle ............. G06Q 20/4016 705/75 |
| 2016/0086183 A1 * | 3/2016 | Roberts ............. G06Q 20/3829 705/71 |
| 2016/0119279 A1 | 4/2016 | Maslak et al. |
| 2016/0119304 A1 | 4/2016 | Lelcuk et al. |
| 2016/0197898 A1 * | 7/2016 | Hozza ............... H04L 63/0442 713/168 |
| 2016/0352680 A1 | 12/2016 | Elsharif et al. |
| 2017/0013044 A1 | 1/2017 | Gervasiychuk |
| 2017/0046706 A1 * | 2/2017 | Agarwal ............ G06Q 20/4016 |
| 2017/0076292 A1 * | 3/2017 | Schmitz ............ G06Q 20/4016 |
| 2017/0366576 A1 | 12/2017 | Donahue et al. |
| 2017/0372219 A1 * | 12/2017 | Crawford ............ H04W 4/029 |
| 2017/0372256 A1 * | 12/2017 | Kantor ................ G08G 5/0013 |
| 2018/0019968 A1 | 1/2018 | Redekop et al. |
| 2018/0108015 A1 | 4/2018 | Rogas |
| 2018/0270161 A1 | 9/2018 | Popescu et al. |

\* cited by examiner

SYSTEM AND METHOD FOR EVALUATING FRAUD IN ONLINE TRANSACTIONS

CROSS-REFERENCE TO RELATED APPLICATION

This application claims priority to U.S. Provisional Application No. 62/412,513 which was filed on Oct. 25, 2016, and is a continuation-in-part of U.S. application Ser. No. 15/701,375 which was filed on Sep. 11, 2017, which application claims priority to U.S. Provisional Application No. 62/385,894 which was filed on Sep. 9, 2016, the contents of which are hereby incorporated by reference.

BACKGROUND

1. Field

The disclosed embodiments relate to Internet traffic. More specifically, the disclosed embodiments relate to methods of evaluating the trustworthiness of Internet traffic.

2. Related Art

The Internet increasingly facilitates more and more transactions between parties. In such transactions, it is important for parties to the transaction to have a certain level of trust or confidence that the other party is not acting fraudulently. This may be difficult in online environments because transactions are completed remotely and anonymously. Methods have been developed to increase trust in transactions, such as by requiring user names and passwords to complete a transaction, or soliciting feedback to verify the presence of a real person instead of a bot (an automated program on a computer running automatically).

However, in some instances, transactions are of a nature that no such traditional mechanisms are not possible. For example, when advertising or other content is presented over the Internet, user names and passwords are traditionally not required to access the content. In many instances, it would be unproductive and undesirable to require such input from the user to access such content. In some instances, trust in these transactions often depends at least in part on knowing a location of a user requesting the transaction. Typically, locations are determined by mapping databases or files that connect an IP address to the last known longitude and latitude of the IP address. However, such files may become quickly outdated. Further, these techniques may be circumvented by several technologies such as virtual private networks ("VPN") or Tor that enable a user to masquerade his or her true location.

Returning to the example of online advertising as an Internet transaction, online advertising or other similar content is presented on various websites. The ability of various websites to attract advertising revenue is based largely on Internet traffic, where traffic is defined as Internet users accessing a web site or requesting content. Website publishers strive to develop the most relevant and interesting content to attract and drive traffic to their sites. The more traffic that a website has, the more advertising revenue the website can generate based on more page requests or click-throughs for a given advertisement. Websites that drive a high amount of Internet traffic may charge more for advertising space on the website. Additionally, advertising algorithms that determine ad placement across several websites may target placement on sites with a high amount of web traffic.

The above-described online adverting environment thus creates a premium on web traffic. This has led to an unfortunate rise in fraudulent web traffic. Fraudulent web traffic may be generated from a variety of sources including through redirects, hidden or embedded web pages, and botnets including computers dedicated to fraudulent activities and/or computers infected by malware. Fraudsters may use this fraudulent traffic to drive more advertising on their sites (or on websites of those buying the traffic from the fraudsters) and to collect revenue for advertisement requests or click-throughs.

For example, much of online advertisement placement is determined automatically based on Internet traffic analytics. In other words, advertisement placement is increasingly being determined via software algorithms instead of face-to-face negotiations between an advertiser and a website operator. Thus, fraudulent traffic may be utilized by some websites to gain more advertisement placements, even though the Internet traffic on their website is non-human in nature.

Many advertisers look to online advertising as a method of advertising that may provide accurate feedback concerning the effectiveness of an advertising campaign as compared to conventional advertising via print, television, radio, or other such mediums. However, this has not turned out to be the case. While advertisers may obtain feedback for online advertisements such as a number of requests for a given advertisement by different websites, the information has not proven to be more reliable than feedback from other mediums such as a billboard advertisement.

There are many reasons for the lack of reliable analytics for online advertising. For example, while the number of requests for an advertisement may be tracked, it is impossible to tell whether a real end user had an opportunity to view the advertisement requested. This may be the case for a number of different reasons.

One such reason is, again, fraudulent internet traffic. It is difficult for companies and the advertisers that they employ to determine if the ad is truly being viewed by a user, or whether a human user is even responsible for the display of the ad. As is understood in the art, numerous methods exist for an automated computer to request an online advertisement without human intervention. These methods may include botnets, viruses, malware, or hidden frames on web pages that may request the ad for display or may provide the appearance that the ad is displayed, even though it is not. This is a serious concern for a company or advertiser as each ad request may require a payment to be made or may count toward a fixed number of ad display instances which were purchased. By some estimates, up to 50% of the ad traffic may be generated by such non-human activity.

Other reasons that a requested advertisement may not be viewed by a real end user is simply that the user is not scrolling to a portion of the webpage where the advertisement is placed. In other words, the advertisement may not be on a viewable portion of the display window. Another reason is simply that no user is currently viewing a screen on which an advertisement is displayed.

Thus, advertisers still need more reliable information concerning whether advertisements placed online are requested by a human and effectively being conveyed to and viewed by an end user and driving that user's behavior. In other applications, content providers, online merchants, and other parties connected to the Internet need relevant feedback of whether a third-party viewing content or attempting to make a transaction is trustworthy.

SUMMARY

Considering the above, many institutions that conduct online transactions such as advertisers or online merchants are becoming more and more concerned with ensuring the security of transactions. For example, online users wish to have an increase in confidence when deciding to allow a transaction between computers, such as to ensure that online advertising is being displayed to real people, and more particularly to a specific target audience.

The disclosed embodiments have been developed in light of the above problems. Accordingly, aspects of the invention may include a method for evaluating trustworthiness for an online transaction. Such a method may include transmitting a detection script to a user device alongside content requested by the user device. The detection script comprises machine readable code that is executable via a web browser or web-based application of the user device such that the detection script is configured to cause the user device to send feedback from at least one sensor on the user device that is accessible by the web browser or web-based application.

The method further comprises receiving the feedback from the user device at a server and evaluating the feedback from the at least one sensor on the user device, obtaining location information for the user device, and calculating a trustworthiness factor for the user device based on the evaluation of the obtained feedback and location for the user device.

In some embodiment, the method further comprises obtaining web browser or web based application information from a document object model of the web browser or web based application from the user device. The method may also set elements in the document object model where the feedback from the at least one sensor is evaluated and compared to expected values based on the setting elements step.

The sensor or sensors may comprise one or more of an accelerometer, a gyroscope, and a magnetometer. The feedback from the sensors may be evaluated and compared to expected values based on the document object model. In another embodiment, the feedback may be evaluated for the presence of an active user of the user device. An active user may be detected when accelerometer, gyroscope, and magnetometer data match expected values based on a history of values for users of the requested content.

In one embodiment, obtaining location information comprises providing a tracking script on the detection script that generates a unique URL encoding an IP address of the user device, receiving a request for an IP address associated with the unique URL at a DNS resolver server from a DNS server upstream from the user device, and correlating the IP address of the client device, the DNS server upstream from the client device, and the DNS resolver server in a database. The method may also comprise receiving a communication from the user device and comparing an expected communication time based on the geographic location of the DNS resolver server and an actual communication time.

The number of the received requests at the DNS resolver server from the IP address of the user device may also be tracked. The trustworthiness factor for the IP address of the user device may decrease when the number of the received requests exceeds a predetermined amount in a predetermined time interval.

In some embodiments, the DNS resolver server is one a plurality of DNS resolver servers with the same anycast destination address. Information received at the plurality of DNS resolver servers may be stored on a logging server. Internet traffic generated from the IP address of the user device may be mapped based on a geographic location of the upstream DNS server and a geographic location of the DNS resolver server.

In some exemplary embodiments, the method may also comprise obtaining velocity and dwell time information from the user device and comparing it to historical velocity and dwell time information of users requesting the content.

According to another exemplary embodiment, a system is provided for evaluating the trustworthiness of online transactions. The system may comprise a source server that provides a detection script to a content delivery server. The detection script may be presented to a user device alongside content requested by the user device and hosted by the content delivery server. The detection script may comprise machine readable code executable via a web browser or web-based application of the user device and configured to cause the user device to send feedback from at least one sensor on the user device that is accessible by the web browser or web-based application.

The system may also comprise a detection server that receives the feedback from the user device and evaluates the feedback from the at least one sensor on the user device, that obtains location information for the user device, and that calculates a trustworthiness factor for the user device based on the obtained feedback and location for the user device.

In some embodiments, the system may further comprise a DNS resolver server that is configured to receive a unique URL generated from the detection script, where the unique URL comprises an IP address of the user device requesting the content. The DNS resolver server receives the unique URL in a request from an upstream DNS server for an IP address corresponding to the unique URL. The DNS resolver server correlates the IP address of the user device encoded in the unique URL and the upstream DNS server as the obtained location information for the user device.

The DNS resolver server may further receive a direct communication from the client device and compares an expected communication time based on a reported geographic location of the IP address of the user device and an actual communication time. The DNS resolver server may track a number of the received requests at the DNS resolver server from the IP address of the user device. In some embodiments, the DNS resolver server is one a plurality of DNS resolver servers with the same anycast destination address.

In further embodiments, the detection script is configured to cause the user device to send web browser or web based application information from a document object model of the web browser or web based application from the user device to the detection sever, and to set elements in the document object model. The feedback from the at least one sensor is evaluated and compared to expected values based on the set elements in the document object model.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

In the following description, embodiments of a system and method of evaluating the trustworthiness of Internet traffic are disclosed. The embodiments are illustrative, and do not limit the scope of the invention.

The Internet facilitates many different types of transactions between parties. Because such transactions are done remotely via computers connected to the Internet, the transactions are completed with parties who otherwise do not know one another. It is also well-known that some actors exploit the anonymous nature of the Internet to facilitate fraudulent and/or criminal activity. Thus, it is important that those offering online transactions have ways to determine whether another party requesting a transaction is trustworthy. The disclosed embodiments may accomplish this through several features, including different combinations of the features.

A first way includes mapping the network infrastructure of a party requesting a transaction. Typically, it is difficult, if not impossible to determine what infrastructure is supporting a connection beyond basic information such as the IP address of the connection. As such, it is difficult to learn anything about the nature or patterns of Internet traffic visiting a particular website or requesting particular content on a website. The following feature allows advertisers, online merchants, law enforcement, or other interested parties to discern the quality of Internet traffic based on generating a map of the supporting infrastructure of the various connections of Internet traffic on a given website. Where there is shared infrastructure, collusion can be detected. Further, computers can be related to one another based on shared infrastructure to determine the possible presence of botnets.

Figure 1:
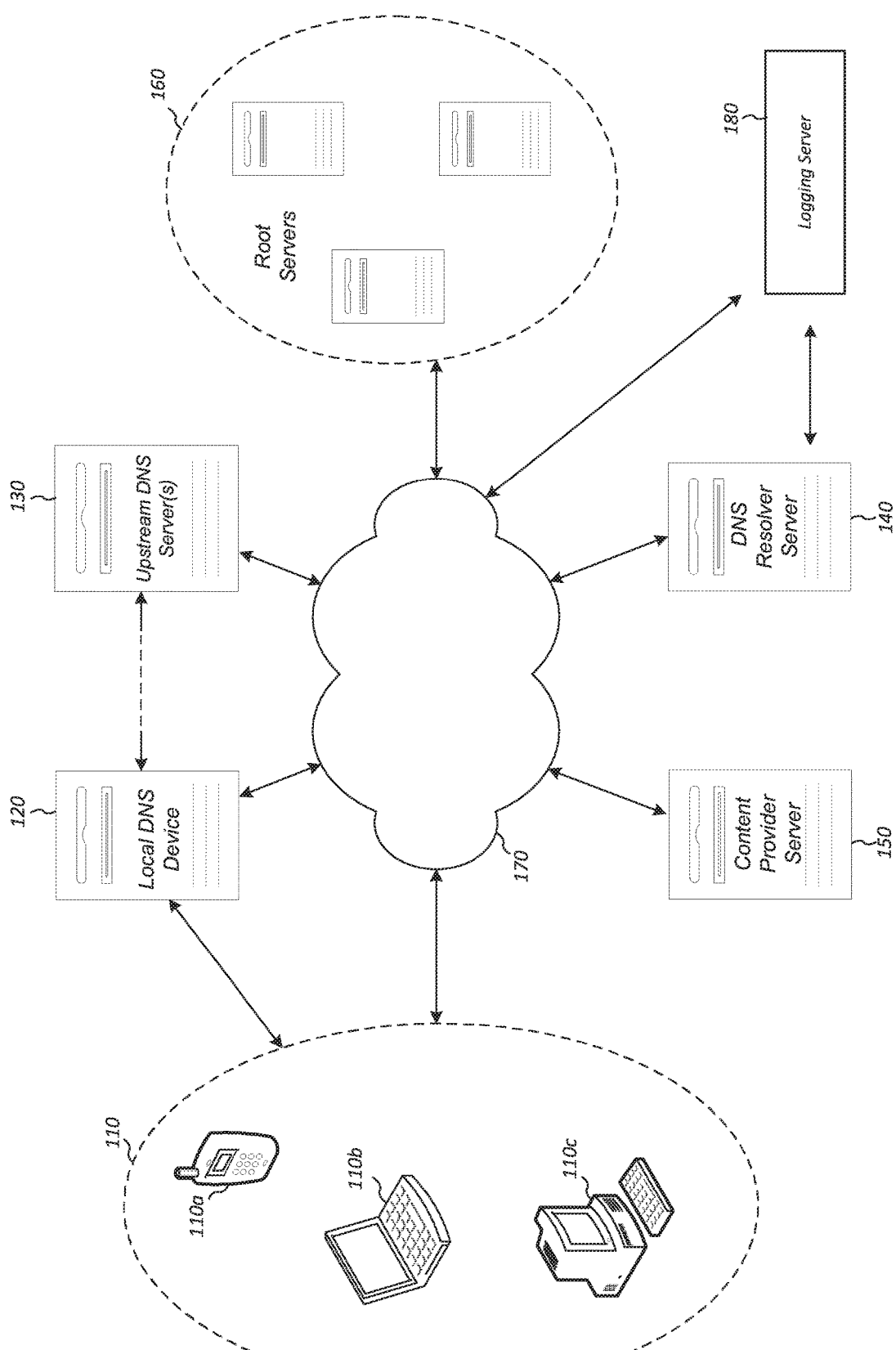
FIG. 1 shows an exemplary infrastructure for a system for detecting fraudulent Internet traffic, according to one embodiment of the invention.

FIG. 1 shows an exemplary infrastructure for a system for detecting fraudulent Internet traffic according to one embodiment of the invention. The infrastructure includes a plurality of client devices 110 such as mobile phones or other mobile devices 110a, laptops 110b, desktops 110c, or other similar devices. The client devices 110 may connect to the Internet via an Internet Service Provider ("ISP"). To find content on the Internet for a given domain name or URL, clients 110 are connected to a local Domain Name Service ("DNS") device 120. This device may be a server provided by an ISP. As is known, the DNS device 120 essentially translates a URL into an IP address for a client device 110 to determine the location of desired content on the Internet.

The local DNS device 120 typically caches IP addresses for URLs. However, when an IP address for a URL is unknown at the local DNS device 120, the local DNS device 120 sends a request to upstream DNS servers 130 to determine the URL location. There may be multiple upstream DNS servers 130 with the request may ultimately ending up with a topmost upstream or authoritative DNS server 130 when the IP address of the URL location is unknown. When a URL location is unknown, the upstream DNS server 130 sends requests to root servers 160 to determine what authoritative DNS server(s) can provide the location of the unknown URL. The root servers 160 direct the upstream DNS server 130 to appropriate other DNS servers to resolve the location of a requested URL by contacting the other DNS servers associated with one or more of the domain names of the unknown URL. When the correct IP address is found for the URL, the upstream DNS server 130 returns the IP address to the local DNS device 120 which in turn provides the IP address of the unknown URL to the client 110.

The infrastructure further incorporates an authoritative DNS resolver server 140 that is associated with a particular domain name. As will be explained in more detail below, when a topmost upstream DNS server 130 is directed from a root server 160 to find an IP address of an unknown URL with a domain name associated with the authoritative DNS resolver server 140, the upstream DNS server 130 sends an IP address request to the DNS resolver server 140 for the IP address of the unknown URL. The DNS resolver server 140 then provides the IP address of the content for the URL to the upstream DNS server 130.

In one embodiment, the DNS resolver server 140 is also configured to map infrastructure of the client devices 110, and to rate a connection or traffic from the client devices, as will be discussed in more detail below. The DNS resolver server 140 is also in communication with a content provider server 150 that provides content to a client device 110 via a network 170 such as the Internet. The content provider server 150 may also conduct data analysis based on information received from the DNS resolver server 150. The DNS resolver server 140 may provide a tracking script or code to be included or embedded within the IP address request, the content, or other request or exchange made available by the content provider server 150. Alternatively, the tracking script may be obtained from the content server 150 or from another external device.

It is noted that the authoritative DNS resolver server 140 may comprise a plurality of servers located at different geographic locations. The DNS resolver servers 140 may be configured to use anycast routing. In this manner, DNS resolver servers 140 at different locations may all answer to the same address based on which server is closest from a network connection perspective. Anycast routing is a network addressing and routing methodology in which data from a single sender is routed to the topologically nearest node in a group of potential receivers, though it may be sent to several nodes, all identified by the same destination address.

A logging server 180 is connected to the DNS resolver servers 140 via a network 170, such as the Internet. The logging server may collect information from the various DNS resolver servers to correlate data to rate Internet traffic in order to identify fraudulent traffic, as will be described in more detail below.

Figure 2:
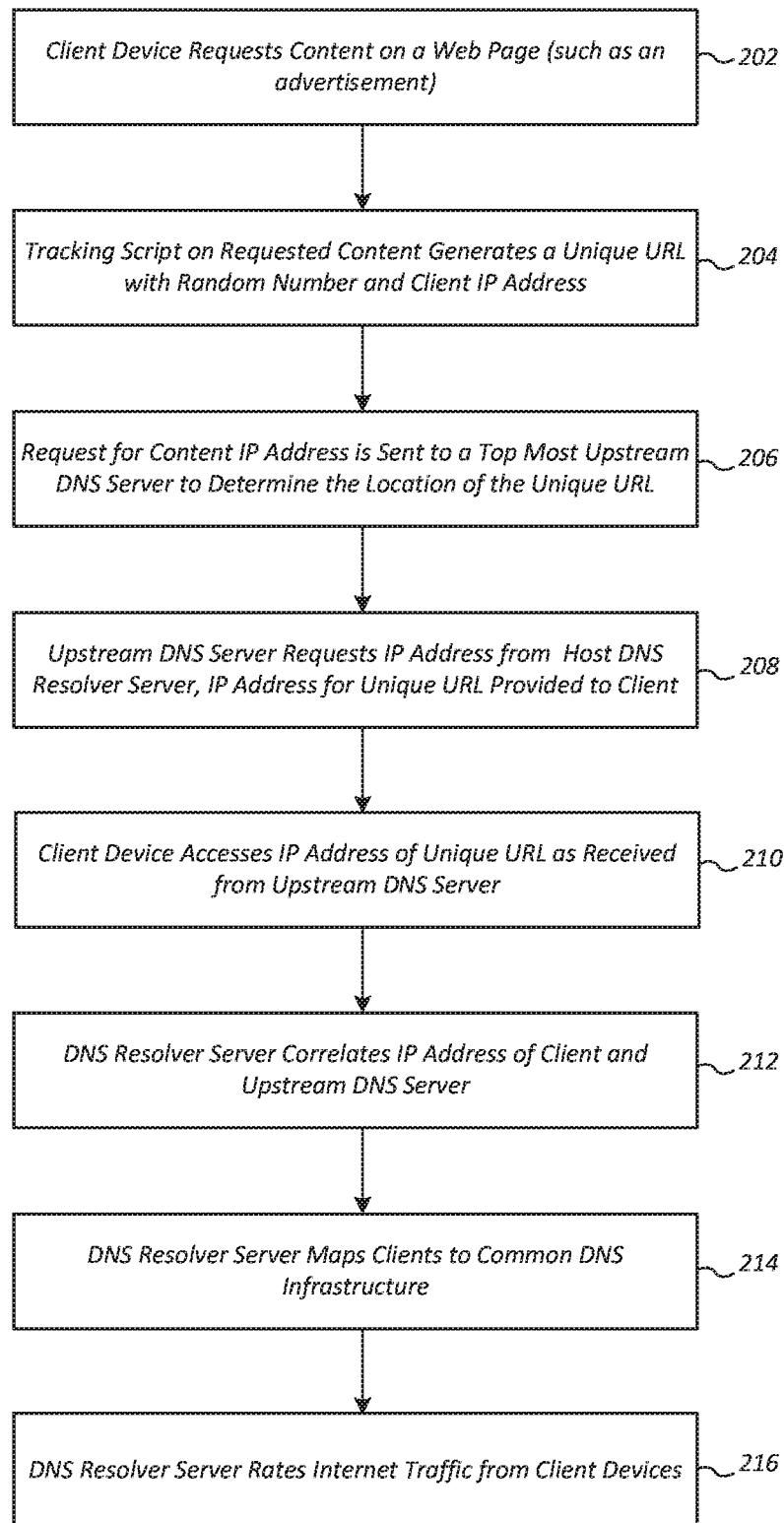
FIG. 2 shows an exemplary process of detecting fraudulent Internet traffic, according to one embodiment.

FIG. 2 shows an exemplary process of detecting fraudulent Internet traffic according to one embodiment. The process may be implemented on the infrastructure shown in FIG. 1 as described above, or any similar Internet or networking infrastructure now known or later developed.

Figure 3:
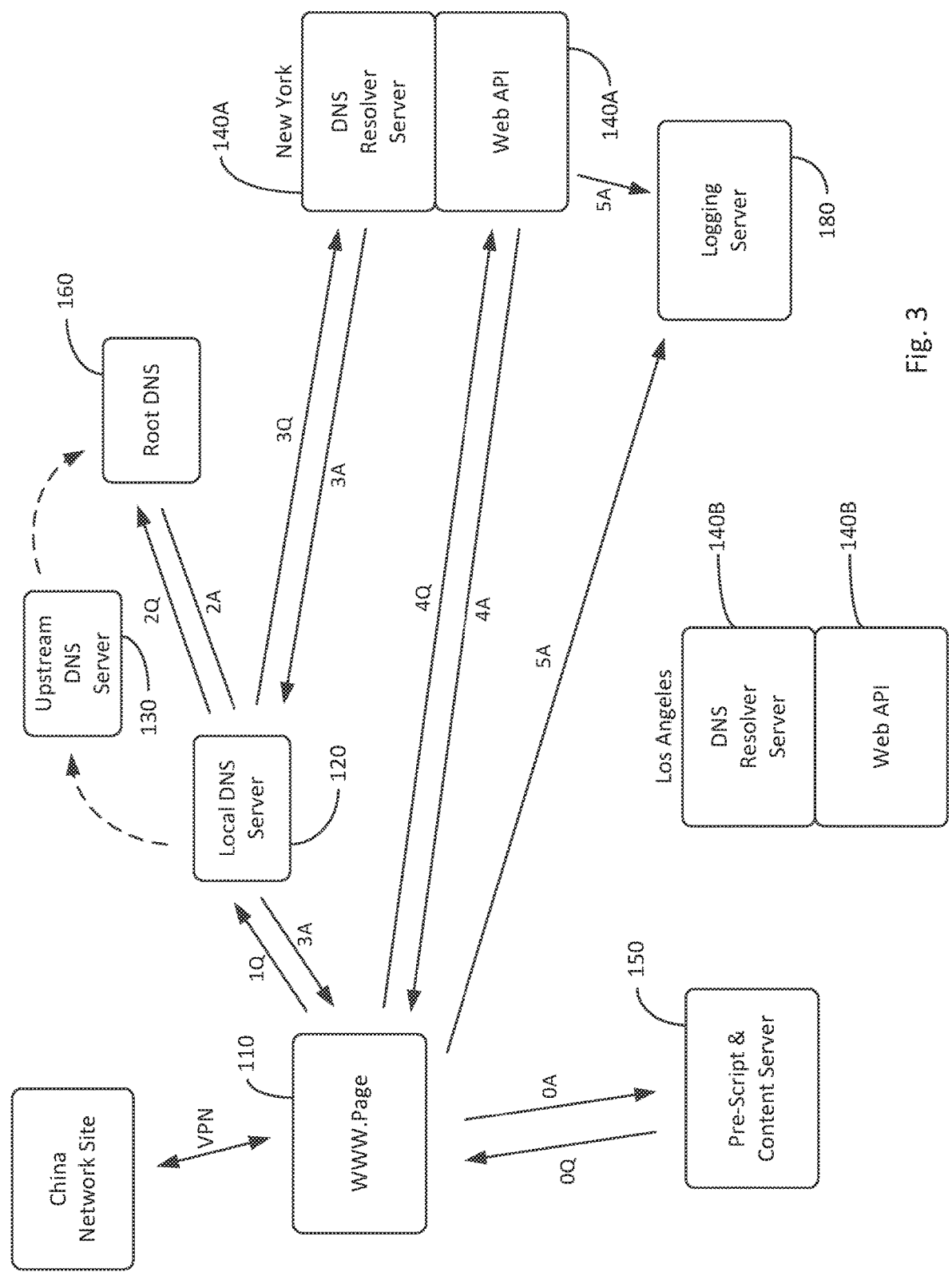
FIG. 3 shows a sequence of communications in an exemplary infrastructure for detecting fraudulent Internet traffic, according to one embodiment.

FIG. 3 shows a sequence of communications using the infrastructure shown in FIG. 1.

In step 202, a client device 110 requests content on a web page. This is shown in one example as communications 0Q and 0A in FIG. 3. The content may include a request for multimedia such as an image or video, a request to conduct an online transaction, or for an advertisement such as a banner ad, link, or other form of online advertising. The client device 110 requests content based on code such as HTML, Javascript, or other code embedded on a web page via a web browser or other web based application. The term web browser (commonly referred to as a browser) is a software application for retrieving, presenting and traversing information resources on the World Wide Web. An information resource is identified by a Uniform Resource Identifier (URI/URL) that may be a web page, image, video or other piece of content. In one example, the client device 110 requests content stored on a content provider server 150 and receives content from the server 150.

In one embodiment, the code or script for the requested content includes a tracking script. The tracking script is described above and herein as being used to track the request and to map the network paths for the request. In step 204, the tracking script on the requested content is executed on a client device 110 web browsing application and generates a globally unique signature encoding the current client device 110 IP address, a time stamp, a unique key, and/or other information that will be used to gain insight into the web traffic generated by the client device. The generated signature is used to create a globally unique URL. This unique URL may thus incorporate, for example, a randomly generated number with the IP address of the client device 110 requesting the content. Other information may also be included such as a timestamp from the browser or web-based application of the client device 110 at the time the request is made to a local DNS server 120.

Because this URL is generated to be a unique URL, the location of the IP address that corresponds to the unique URL is unknown to the client device 110. Similarly, because the URL is uniquely generated, a local DNS device 120 does not have a cached IP address location for the generated URL. That is, the globally unique URL (based on client device IP and unique key (code)) has ultimately been configured at the root servers 160 of the Internet 170 (or a higher-level server) to point to the authoritative DNS resolver server 140.

To determine the IP address of the URL in the tracking script, the local DNS device 120 sends a request through one or more upstream DNS servers to the authoritative upstream DNS server 130 to determine the IP address of the unique URL in step 206. This is shown as communication 1Q in FIG. 3. As explained above, because the URL is globally unique, the authoritative DNS server 130 queries a root server 160 to determine which server can provide the IP address for the unique URL. This is shown as communication 2Q. The root server 160 points the upstream DNS server 130 to the DNS resolver server 140. The DNS resolver server 140 may be one of a plurality of servers 140 that is accessed using anycast protocol as described above.

In step 208, the upstream DNS server 130 that received the request for the unique URL requests the IP address of the unique URL from the DNS resolver server 140. This is shown as communication 3Q. The DNS resolver server 140 identifies the upstream DNS server 130 from which the request was received, including the IP address of the upstream DNS server 130. The DNS resolver server 140 provides the IP address of the unique URL, to the upstream DNS server 130. This is communication 3A in FIG. 3. The IP address for the requested content is then sent back the client device 110 via the upstream DNS server 130. This is communication 1A in FIG. 3.

Because the unique URL delivered in the IP address request to the DNS resolver server 140 includes the unique signature encoded in the URL, the DNS server 140 decodes the URL revealing the signature including the unique key, a time stamp, and the IP address of the requesting client device 110. Further, because the DNS resolver server 140 obtains the IP address of the upstream DNS 130 server making the request for the location of the content, the DNS resolver server 140 may correlate client devices 110 to upstream DNS servers 130 in step 210. Additionally, because the DNS resolver server 140 may be a plurality of servers utilizing anycast routing, the network location of the upstream DNS server 130 may be determined by the location of the DNS resolver server 140 receiving the request. In the Example in FIG. 3, communication 3Q was sent to resolver server 140A in New York rather than DNS resolver server 140B in Los Angeles based on anycast routing. In this manner, the DNS resolver server 140 may relate a client device 110 to upstream infrastructure, that is, the upstream DNS server 130. Accordingly, network map data is created based on requesting entities or devices.

It is also noted that while it is described above that the DNS resolver server 140 may conduct the analysis of the IP address requests for the generated unique URL, the embodiments are not limited to this. Data from the requests received at the DNS resolver server 140 (which may include a plurality of servers using anycast routing) may be sent to a logging database, such as the database 180 or to some other server or database. The analysis, including the decoding of the unique URL, may then be conducted via data collected at the logging database. This is shown as communication 5A in FIG. 3.

In step 210, the client device 110 upon receiving the IP address for the unique URL, makes a request directed to the received IP address. In this embodiment, the received IP address is the DNR resolver server 140. The tracking script, for example, may instruct the client device 110 to contact the DNS resolver server 140. Upon receiving the request from the client device 110, the DNS resolver server 140 may log the IP address and a time stamp and transmit the data to the logging database 180. These communications are shown in FIG. 3 as 4Q and 4A. The script may also instruct the client device to send a result of communication 4A to the logging server 5A to collect additional data.

As multiple requests for the IP address of unique URLs from various client devices 110 are made, the DNS resolver server 140 can correlate multiple client devices 110 with various upstream DNS servers 130, as outlined in step 212. With these correlations, the DNS resolver server 140 can map the client devices 110 to the various upstream DNS servers 130, as shown in step 214.

With the ability to map or identify requesting devices, the infrastructure of requesting client devices, as well as the validity or invalidity of Internet traffic can be assessed, and a rating for the internet traffic from client devices 110 may be rated, as in step 216. For example, client devices 110 can be correlated with one another and therefore be correlated to known bad IP addresses, indicating the presence of a botnet. Further, distinct or similar patterns that establish repeat traffic coming from a certain infrastructure may also suggest the presence of a botnet driving Internet traffic. For example, a user may request content 1 to 10 times during a given time interval, but 1000 requests during the time interval for content from a single device or IP address is indicative of fraudulent advertising access or fraudulent web site hits. The rating may indicate a percentage or likelihood that the Internet traffic is fraudulent.

In another example, time stamps from a request for an IP address for the unique URL may be compared with the time stamp received from the client device 110 from the resulting direct request. The difference between the time stamps may be compared to an expected difference based on a reported location of the IP address. This can help detect fraudulent Internet traffic by identifying client devices being operated from locations that are likely different than reported locations. This can help detect the presence of client devices being operated by a virtual private network and to estimate a location of the control device 390 operating through the virtual private network. For instance, the IP address of the client device 110 and anycast routing to a DNS resolver server 140 may indicate that the client device 110 is located proximate to New York. The DNS resolver server may then compare a time of the communication between the client device 110 to the DNS resolver server 140 to an expected time based on the reported location proximate to New York. If the time does not match the expected time, then it may be determined that there is a virtual private network and control of the device from outside New York. The farther the distance outside an expected distance, the more likely a traffic rating shows as fraudulent.

The correlations obtained may be combined with other data obtained to detect fraudulent Internet traffic, malware, and the like that are now known and may be later developed. Steps may be taken to disable access from the requesting devices determined to be fraudulent or bot sites or content providers may specify that they will not provide payment for access from these sites or devices.

The script may require other tests based on a rating of the DNS resolver server 140. For example, if a rating denotes that the Internet traffic is suspicious, the DNS resolver server may send instructions to access specific DNS resolver servers simultaneously, in order to gain information of the location of the client device 110. Other follow up checks may be conducted to determine a final rating of the internet traffic.

In some embodiments, the tracking script may be run together with the content delivery. In other embodiments, the tracking script may run as a side process independent of the content delivery. For example, a script for requesting content from the content server 150 may simultaneously provide the multimedia, advertising, or other content to the user device via a known or cached IP address while also generating the unique URL. The content for the unique URL runs in the background, for example, in a hidden frame of a webpage. In this manner, the client device 110 may quickly retrieve the content to display on a web page, while the DNS resolver server 140 is still able to track the IP address of the client device 110 and correlate the same with the IP address of the upstream DNS server.

Stated another way, or in an alternative embodiment, the executable tracking routine is delivered alongside the content that is to be protected from fraudulent access (access which is not by a live user, but by a bot or automated system) from an ad server either directly or via another ad server.

Once delivered and from within the user's browser the tracking routine executes and generates a globally unique signature and encoding of the current client's IP address and uses that signature to create a globally unique URL that has ultimately been configured at the root servers of the Internet to point to a specialized DNS resolver server. This process generally occurs via recursion through several upstream DNS servers from the client. DNS servers are configured to respond based on either information from a parent server or information from the root servers. When the request gets to the top most server, that is the server that is configured to ask the root servers, the root servers tell the requesting server that the only server that has the answer to the question (address information) it is seeking are the specialized DNS resolver servers and are associated with or in communication with the system that generated the unique address. These specialized DNS resolver servers can be placed at multiple data centers around the world or at a single location. The top most DNS server in the chain then takes this information and directly queries the authoritative DNS server, which may also be referred to as a specialized DNS resolver server.

In one embodiment, the specialized DNS resolver servers are configured to use anycast routing which means that there are multiple servers in multiple places that all answer to the same address. The anycast routing ensures that the server that is closest to a network connection perspective is the server that receives the connection. Information about which of the specialized DNS resolver servers ultimately receives the resolution request is factored into the data collection and analysis process.

After the top most DNS server queries the specialized DNS resolver server for the information, the specialized DNS resolver server decodes the URL revealing the signature that the executable routine had created, this includes a unique key and the original client's IP address. That information is then paired with the location of the specialized DNS resolver server that has received the request and reports back to a data analysis server(s). The data analysis server(s) then records this information and uses it to form decisions as to the validity of future inbound transaction or advertising requests via that server. This may indicate fraud if a high number of requests all arrive from the same requesting entity or the timing of such request could not be executed by a human.

Figure 4:
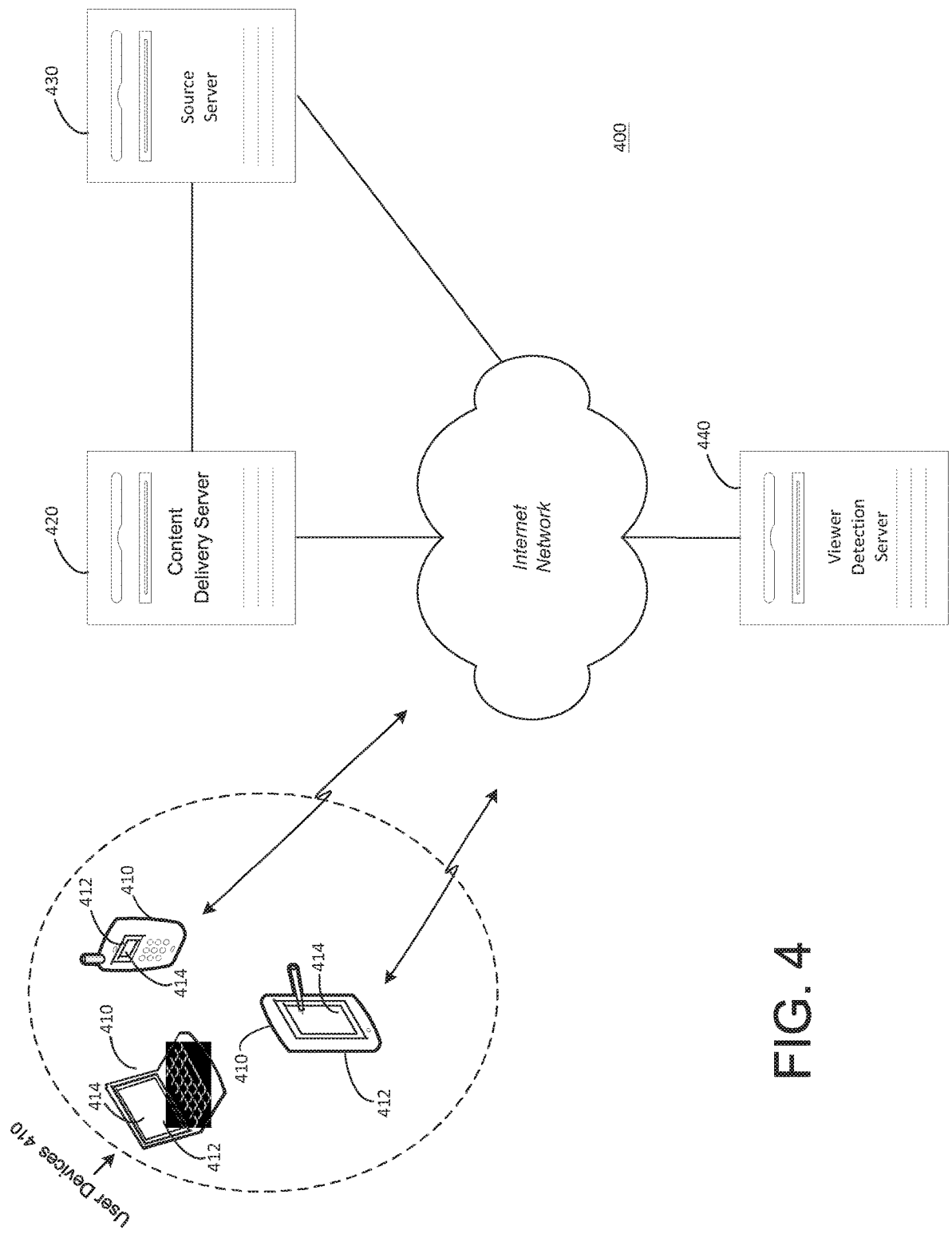
FIG. 4 is a block diagram of a verification system to detect active users according to one embodiment of the invention.

FIG. 4 is a block diagram of a verification system to detect the presence of active users according to one embodiment of the invention. Another feature disclosed herein to evaluate the trustworthiness of a party to an online transaction includes checks to detect the presence of an active viewer. A system 400 that is configured to detect the presence of active viewers includes a plurality of user devices 410. The user devices 410 may include mobile computing devices such as laptops, tablet computers, mobile phones, and the like, or fixed devices equipped with one or more sensors that can produce sensor data.

The user devices 410 include memories including RAM and ROM and a processor that executes machine readable code stored on a memory of the user device. The devices 410 further include a display 412 configured to display content from the Internet. The devices 410 may each run a web browser 414 or other web based application for displaying Internet content on the display 412. It is also contemplated that the user devices 410 have one or more sensors that provide data regarding the status or condition of the user device over time. Numerous sensor(s) may provide this type of data including, but not limited to gyroscope, accelerometer, magnetometer, GPS, capacitances sensors, touch screen sensors, camera, or any other sensor that provides data regarding a physical aspect of the device.

When a user views a web page on the display 412 of the device, 410, the device requests the content of the web page from a server 420. The server 420 sends a request to one or more remote servers that stores the requested web page to obtain the information concerning all content displayed on a web page or only portions of the content displayed on the web page. For example, the server 420 may be a content delivery server 420 that delivers contents such as advertisements based on requests for web page content which are sent from the user's device 410. Of course, any type of content may be delivered by the server 420.

The content such as advertisements provided from the content delivery server 420 may originate from a single server 420 or any number of different servers. For example, a web page may be stored on a first server and may also request content such as advertisements or multimedia that is stored on a second server.

In order to determine whether content is being viewed by a real person, the system 400 further includes a viewer source server 430. The source server 430 provides a viewer tracking module (executable software code) to be incorporated with the content such as an online advertisement or other content from the content delivery server(s) 420. When an advertisement or other content with a viewer tracking module is delivered to a user device 410, the viewer tracking software is executed by the requesting user device (such as by the user device processor in connection with software such as a web browser or other web-based application stored on the memory). As a result of the viewer tracking software being executed, sensor data is returned to a viewer detection server 440 which tracks whether the content is being viewed by the end user and whether the end user is an active user (human).

In other embodiments, the use of the source server 430 may be avoided and the and the viewer tracking module is provided directly by the content delivery server 420. In another embodiment, the source server 430 and the viewer detection server 440 are the same server. In another embodiment, the request for the viewer tracking module is sent directly by the user device 410, when requesting to view the web page content or an advertisement on a web page, to the viewer detection server 440. In this embodiment, the viewer detection server 440 sends the viewer tracking module to the user device.

The viewer tracking module may be implemented as machine readable code that is incorporated into content such as an online advertisement or other web site content. The code is executed on a web browser 414 of a user device 410 displaying the content. When the code is executed, the web browser 414 utilizes available sensors to the web browser to determine whether a user is viewing the content or advertisement. The device 410, via the web browser 414, then sends the sensor data obtained from the sensors to the viewer detection server 440 for analysis.

The user devices 410 may include a plurality of sensors to determine whether a viewer is engaged with the content on a website. Further, the user device 410 may report information regarding the device itself including the current operating condition of the device to determine whether a user is engaging with the online content.

In one embodiment, the user device 410 may report a display screen size and resolution and an amount of a web page that is currently visible on the display. As an example, if the web page displaying the content is only 5 pixels by 5 pixels in screen size, then the determination can be made that a human is not viewing this page or that a human is not actively viewing this page and hence, this may be a fraudulent page view performed only to generate advertising revenue. As another example, such as with a user device, the determination can be made that only a portion of the web page is visible, and the tracked content is not on the viewable portion of the display, or is not completely within the viewable portion of the display.

The user device 410 may further include various sensors such as an accelerometer, gyroscope, microphone, magnetometer, GPS, camera, and the like. The web browser 414 of the user device 410 may access one or more of the sensors to determine whether a user is engaged with the online content.

Typically, on a user device 410, a web browser has access to the device's accelerometer, magnetometer, and gyroscope. Thus, in a preferred embodiment, the web browser may track accelerometer, magnetometer, and gyroscope data from the device while online content or advertising is displayed on the browser 414. The data is returned to the viewer detection server 440 for analysis.

The viewer detection server 440 determines whether tracked online content, such as a banner advertisement, is viewable on the display 412. When the content is viewable, the viewer detection server 440 analyzes the data from the gyroscope, magnetometer, and accelerometer to determine whether a user was engaged with the user device 410 while the content was viewable. For example, when a user of a user device 410 is interacting with the device 410, the accelerometer may detect movements due to a person holding the device 410. The accelerometer is very precise and any slight movement can be detected, even if the user is not moving or trying to be still. Similarly, the gyroscope may detect changes in device orientation when a user holds and interacts with the user device 410. Similar changes may also be detected in a magnetometer of the device 410. In this manner, the detection server 440 determines that online content such as online advertisement was actually viewed by a user of a user device 410, or that it was not an automated fixed computer which has hundreds of browsers open simultaneously.

The invention is not limited to the above embodiment. When a device's web browser 414 has access to other sensors, some of which may be allowed based on the user device's user settings or permissions obtained by a user, data from the other sensors may also be utilized. For example, camera data may be obtained from data retrieved by a camera to determine that a person is actually viewing the display 412 when the advertisement is viewable on the display 412. Microphone data can detect sounds caused by manipulation of the device. Any other such data that the web browser 414 may access can be utilized. Further, the invention is not limited to a web browser. The same principles may be utilized in mobile applications that deliver advertisements or other online content.

Figure 5:
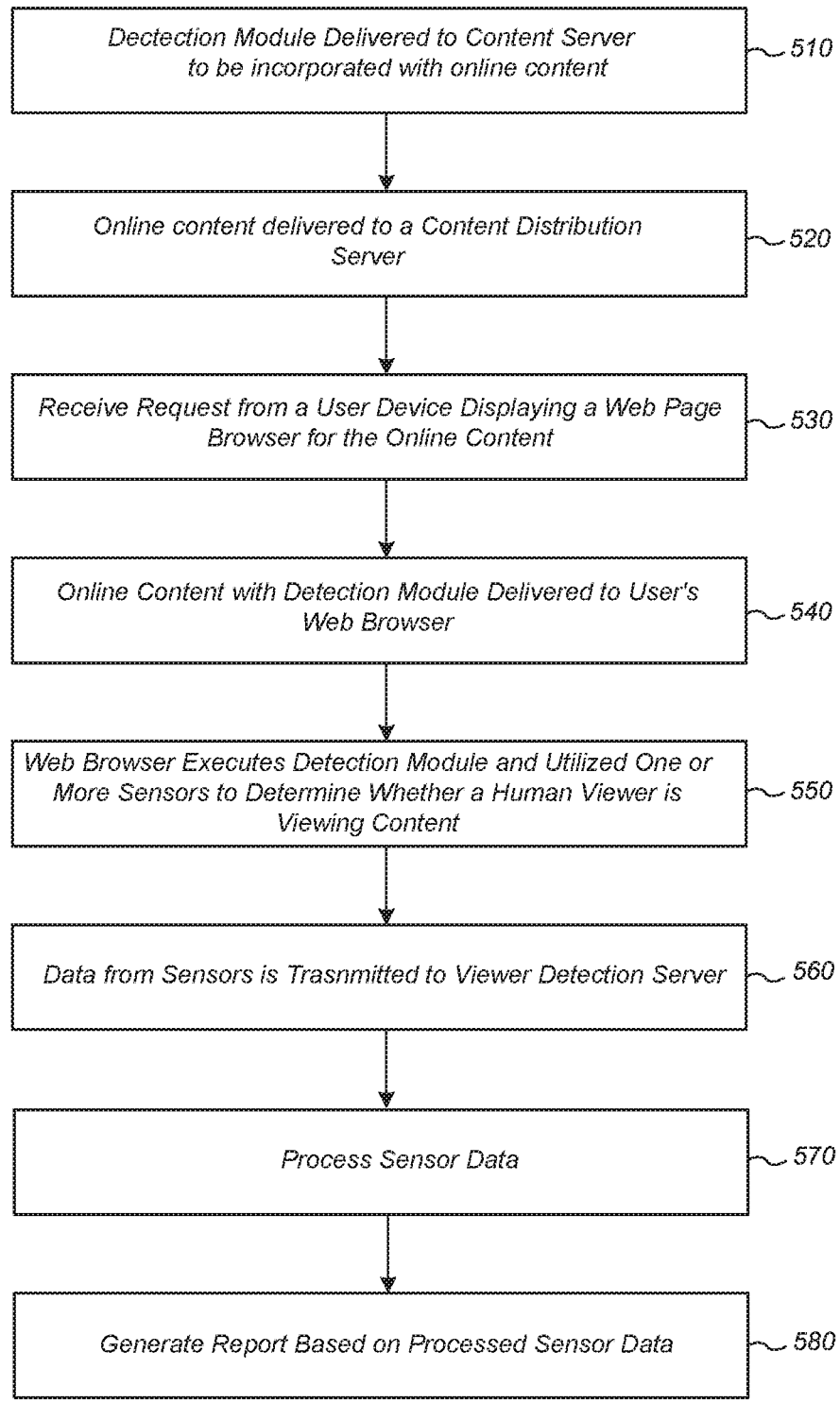
FIG. 5 is a flow chart illustrating a verification method to detect active users according to one embodiment of the invention.

FIG. 5 is a flow chart illustrating a verification method to detect active users according to one embodiment of the invention. In step 510, the active view detection module is sent to the content delivery server 420 such as an advertising server to be incorporated with online content, such as a banner ad for a web page. As explained above, the module may include machine readable code that is incorporated into the online content on the content source server.

In step 520, the content on the content delivery server 420 may be optionally requested by one or more separate delivery servers 420 such as an advertisement distribution server. In step 530, a user device 410 requests the online content or advertisement for display on a web page in a web browser 414 or via another web-based application running on the user device 410. Thus, the web site hosted at a server 420 receives a request for web page content, multimedia content, and/or advertising content from the user device 410. In step 540, the delivery server 420 sends the content or advertisement with the viewer detection module from the source server 430 to the user device 410 based on the request from the web browser 414. It is noted that it is also possible that additional transfer servers may be required to deliver the content, or that the content may be delivered directly from the content delivery server 420.

In step 550, the web browser 414 executes the machine-readable code that forms the viewer detection module that is incorporated on the content delivered to the web browser 414. The web browser 414 utilizes one or more sensors on the device 410 to obtain data to determine whether a human user is viewing the content delivered to the web browser 414. That is, the web browser obtains data on the ability of a human to view the content, such as the size of the window in which the content is displayed, and data on whether the human is actively engaged with the content, such as from an accelerometer and gyroscope.

In step 560, the device 410 transmits the data obtained by the sensors to the viewer detection server 440. The viewer detection server 440 may then determine whether the delivered content was viewed by an end user of the device 410.

At a step 570 the viewer detection server 440 processes the sensor data to form a determination regarding whether the web content was displayed in a way that the content or advertisement was viewable, and whether the advertisement was actually viewed by a human. At a step 580 the viewer detection server 440 generates a report that indicates which web site content requests were actually viewed by a human end user of the content. This report can be used to adjust payments made to a hosting website or online advertising placement agency, to provide accurate advertising feedback to facilitate better online advertisement placements or to control/disable access from certain websites or placement agencies. The report may be sent to the content delivery server 420.

Another feature that may be used to evaluate the trustworthiness of Internet traffic (a computer requesting a transaction) may be one or more checks using the document object model of the web browser 414 of the user device 410 (FIG. 4). As is known in the art, web browsers include a document object model (DOM) that enable the browser to display a web page from a programming language such as HTML. The Document Object Model (DOM) is a cross-platform and language-independent application programming interface that treats an HTML, XHTML, or XML document as a tree structure wherein each node is an object representing a part of the document. The objects can be manipulated programmatically and any visible changes occurring as a result may then be reflected in the display of the documentInformation may be obtained by a host of a website from the DOM of the browser accessing the website. This information may comprise the capabilities of the browser, including the browser type, version, operating system, sensors available, etc. As a result, the DOM provides information that can be used to learn information regarding the browser and system that is accessing a web page. This information obtained from the DOM may be compared to information presented by the host (which may or may not be true) to evaluate or detect possible fraud. This is but one element among many factors.

The script is provided with or as part of the content displayed on a web page from the source server 430 may include coded instructions that manipulate or test the DOM information to help determine whether a person requesting the transaction is trustworthy.

For example, a web browser 414 of a user device 410 may access content from the content delivery server 420 such as multimedia, an advertisement, or a request to conduct an online purchase from an online merchant, or any other type of content request. A script running alongside the content from the source server 430 may be used to validate information obtained from the DOM of the user device 410.

In one example, the DOM of a browser 414 of a user device 410 may report that the web browser is a mobile version of the Safari web browser running on an iOS operating system. The script may be configured to check whether the browser actually matches the information in the DOM or whether a different computing device is attempting to masquerade as the Safari browser on iOS. If the DOM is reporting or contains incorrect information, this may be a sign that the request for content and associated advertising is not from a real user, but instead form a system design to access a site to only generate advertising or content access totals.

One check of the DOM may include obtaining information from device sensors of the requesting hardware (mobile telephone, tablet, mobile communication device, desktop computer) that are available to the browser and checking to see if the data from the sensor matches an expected value. For example, different phones from various manufacturers use different sensors that have varying levels of sensitivity and will often provide data that changes over time, such as gyroscope or accelerometer data. Upon receiving data from the sensors of the user device 410, the viewer detection server 440 may check to see that the values from the sensors, such as accelerometer, magnetometer, and gyroscope data matches expected values and expected changes in values. In this manner, it may be determined whether the hardware on a device matches an expected behavior based on the reported device from the DOM. Continuing from the previous example, when the Safari browser running on iOS is reported from the DOM, it would be expected that sensor date will match hardware that is phone on the iPhone. If it does not match, then the content requestor may not in fact be a real person, but instead a BOT or automated system configured to just generate web page access values to increase advertising revenue.

Another test conducted on the DOM is to check whether elements of the DOM are settable by the script running alongside the content. For example, the script may set the x, y, and z values of the accelerometer to determine whether the values are enforced by a JavaScript running on the device or are instead set by underlying code. This helps to determine whether there is an attempt to masquerade a true identity of the device vs the reported device. Other checks may also be completed by changing other various elements in a non-destructive manner to measure the reaction of the DOM to the changes. These tests are performed to gain information regarding the content requestor to determine if the advertising is effective or should be paid for or purchased again.

An additional to determine a trustworthiness level is by comparing user activity with expected values. When real people navigate a website, they may behave in a certain way. When Internet traffic falls outside of expected values, this may increase the likelihood that the traffic is fraudulent. For example, when real people navigate an online merchant's website to browse products being offered for sale, it is expected that the user will have a certain "velocity" as the user browses various options. Velocity refers to how quickly the user progresses to another page and how long the user dwells on a given page. When a web browser of a device has an unexpectedly high velocity, this may indicate the presence of a bot or other untrustworthy internet traffic that is accessing web pages to make it appear that real users are accessing the page, when in fact it is just a bot or automated system. In some embodiments, an expected velocity and/or dwell time may be set over time based on average velocity and dwell time spent on a website by a majority of the users. The velocity factor may be used to evaluate traffic and make future advertising decisions based on that factor, among others.

In another embodiment, device feedback may be checked and compared to expected values. For example, the accelerometer and gyroscope may be checked to see if the orientation of the device corresponds to natural movements of a user accessing the website. In one example, when the accelerometer and gyroscope indicate that the device is held upside down and is relatively stable or does not move for extended periods of time while the device browses through a website, it may be determined that the sensor data is fraudulent and outside of expected behavior for a normal person using a mobile device with a sensor.

Thus, there are a variety of checks that are completed to determine whether Internet traffic is trustworthy. In some embodiments, one or more or all of the checks may be used. When multiple checks are used, the viewer detection server 440 may weigh the various tests to provide a trustworthiness score. For example, the system bases the score on the mapped location, whether an active viewer is interacting with the content, DOM tests, and user behavior versus expected values. From one or more of these factors, an overall score may be generated. In some embodiments, each factor is equally weighted. In other embodiments, certain factors may weigh more heavily than others in the calculation of the final score.

The weights of the trustworthiness scores may be based on the type of content presented by the content delivery server 420. For example, an online merchant may look at velocity and dwell time more heavily than an online advertisement distribution service. Advertisements for apps accessible via only a certain platform, such as the Apple App Store or the Google Play App store may weigh DOM tests more heavily than other implementations.

The score may be used by the content delivery service to determine whether to complete an online transaction. For example, the score may be used as part of an advertisement distribution algorithm, to determine whether to allow an online sale of goods or services, or the like.

Figure 6:
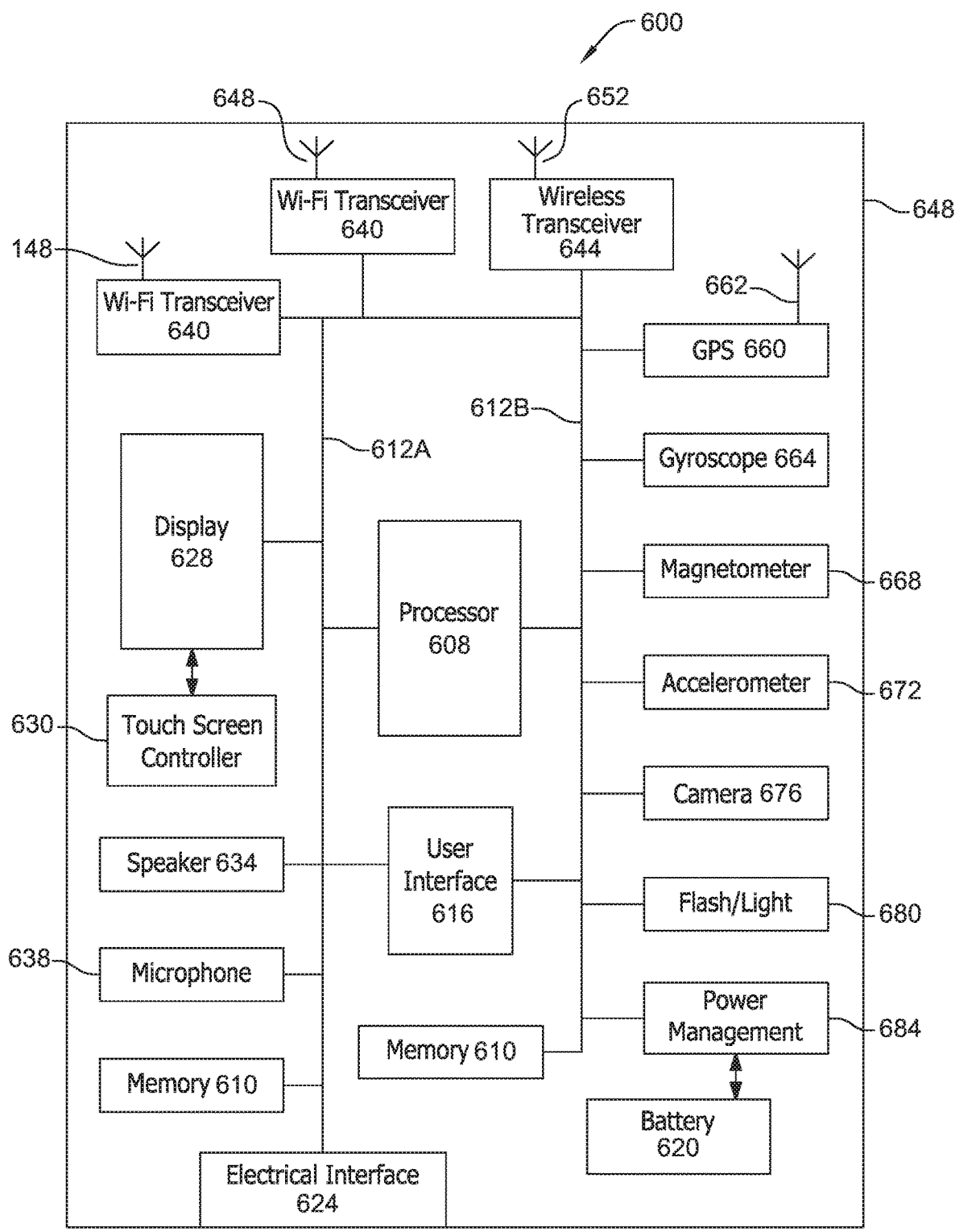
FIG. 6 is an example embodiment of a mobile device.

FIG. 6 illustrates an example embodiment of a mobile device. The mobile device is exemplary of the mobile devices utilized herein, as described above. This is but one possible mobile device configuration and as such it is contemplated that one of ordinary skill in the art may differently configure the mobile device. The mobile device 600 may comprise any type of mobile communication device capable of performing as described below. The mobile device may comprise a PDA, cellular telephone, smart phone, tablet PC, wireless electronic pad, an IoT device, a "wearable" electronic device, or any other computing device.

In this example embodiment, the mobile device 600 is configured with an outer housing 604 configured to protect and contain the components described below. Within the housing 604 is a processor 608 and a first and second bus 612A, 612B (collectively 612). The processor 608 communicates over the buses 612 with the other components of the mobile device 600. The processor 608 may comprise any type processor or controller capable of performing as described herein. The processor 608 may comprise a general-purpose processor, ASIC, ARM, DSP, controller, or any other type of processing device. The processor 608 and other elements of the mobile device 600 receive power from a battery 620 or other power source. An electrical interface 624 provides one or more electrical ports to electrically interface with the mobile device, such as with a second electronic device, computer, a medical device, or a power supply/charging device. The interface 624 may comprise any type electrical interface or connector format.

One or more memories 610 are part of the mobile device 600 for storage of machine readable code for execution on the processor 608 and for storage of data, such as image data, audio data, user data, medical data, location data, accelerometer data, or any other type of data. The memory 610 may comprise RAM, ROM, flash memory, optical memory, or micro-drive memory. The machine-readable code as described herein is non-transitory.

As part of this embodiment, the processor 608 connects to a user interface 616. The user interface 616 may comprise any system or device configured to accept user input to control the mobile device 600. The user interface 616 may comprise one or more of the following: keyboard, roller ball, buttons, wheels, pointer key, touch pad, and touch screen. A touch screen controller 630 is also provided which interfaces through the bus 612 and connects to a display 628.

The display 628 comprises any type display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 628 receives signals from the processor 608 and these signals are translated by the display 628 into text and images as is understood in the art. The display 628 may further comprise a display processor (not shown) or controller that interfaces with the processor 608. The touch screen controller 630 may comprise a module configured to receive signals from a touch screen which is overlaid on the display 628.

Also part of this exemplary mobile device is a speaker 634 and microphone 638. The speaker 634 and microphone 638 may be controlled by the processor 608. The microphone 638 is configured to receive and convert audio signals to electrical signals based on processor 608 control. Likewise, the processor 608 may activate the speaker 634 to generate audio signals. These devices operate as is understood in the art and as such are not described in detail herein.

Also connected to one or more of the buses 612 is two or more Wi-Fi transceivers 640 with respective antennas 648. One or more additional wireless transceivers 644 are also provided with respective antennas 652. The transceivers 640, 644 are configured to receive incoming signals from a remote transmitter and perform analog front-end processing on the signals to generate analog baseband signals. The incoming signal maybe further processed by conversion to a digital format, such as by an analog to digital converter, for subsequent processing by the processor 608. Likewise, the transceivers 640, 644 are configured to receive outgoing signals from the processor 608, or another component of the mobile device 608, and up convert these signal from baseband to RF frequency for transmission over the respective antenna 648, 652.

It is contemplated that the mobile device 600, and hence the Wi-Fi transceivers 640 and additional wireless transceiver 644 may be configured to operate according to any presently existing or future developed wireless standard. For example, the Wi-Fi transceiver may operate according standards including, but not limited to Wi-Fi such as IEEE 802.11 a, b, g, n, ac wireless LAN. The wireless transceiver may operate according to standards including, but not limited to, Bluetooth, NFC, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 612B which also interface with the processor 608. These devices include a global positioning system (GPS) module 660 with associated antenna 662. The GPS module 660 is capable of receiving and processing signals from satellites or other transponders to generate location data regarding the location, direction of travel, and speed of the GPS module 660. GPS is generally understood in the art and hence not described in detail herein. A gyroscope 664 connects to the bus 612B to generate and provide orientation data regarding the orientation of the mobile device 604. A magnetometer 668 is provided to provide directional information to the mobile device 604. An accelerometer 672 connects to the bus 612B to provide information or data regarding shocks or forces experienced by the mobile device.

One or more cameras (still, video, or both) 676 are provided to capture image data for storage in the memory 610 and/or for possible transmission over a wireless or wired link or for viewing at a later time. The one or more cameras 676 may be configured to detect an image using visible light and/or near-infrared light. The cameras 676 may also be configured to utilize image intensification, active illumination, or thermal vision to obtain images in dark environments.

A flasher and/or flashlight 680, such as an LED light, are provided and are processor controllable. The flasher or flashlight 680 may serve as a strobe or traditional flashlight. The flasher or flashlight 680 may also be configured to emit near-infrared light. A power management module 684 interfaces with or monitors the battery 620 to manage power consumption, control battery charging, and provide supply voltages to the various devices which may require different power requirements.

Figure 7:
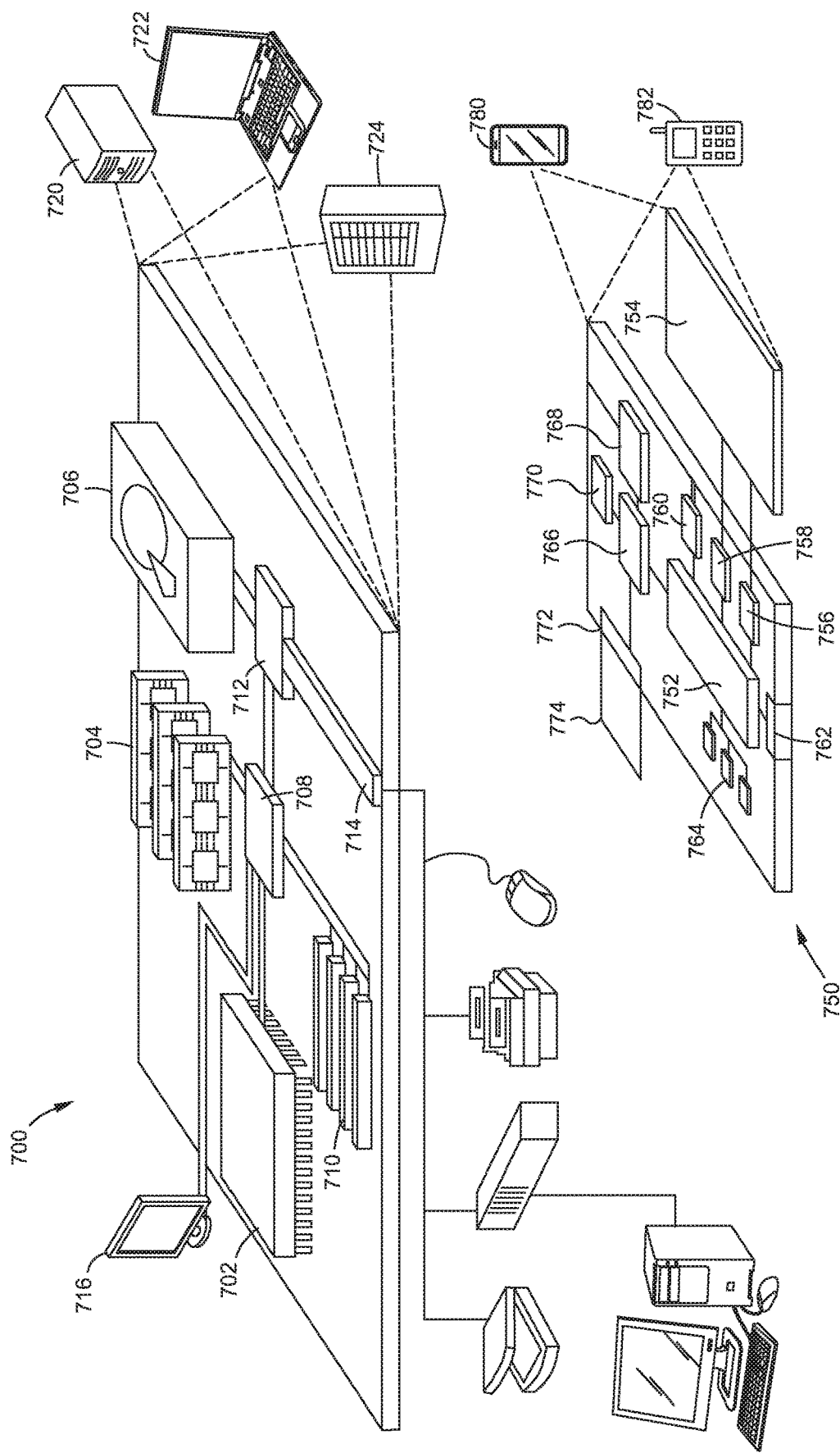
FIG. 7 is a schematic of a computing or mobile device such as one of the devices described above, according to one exemplary embodiment.

FIG. 7 is a schematic of a computing or mobile device such as one of the devices described above, according to one exemplary embodiment. FIG. 7 shows an example of a computing device 700 and a mobile computing device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 700 includes a processor 702, memory 704, a storage device 706, a high-speed interface or controller 708 connecting to memory 704 and high-speed expansion ports 710, and a low-speed interface or controller 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed controller 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed bus 714. The low-speed bus 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wifi, or other such transceiver (not shown). In addition, GPS (Global Positioning system) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 700 and/or 750) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for evaluating trustworthiness for an online transaction, the method comprising:
   transmitting a detection script to a user device alongside content requested by the user device, the detection script comprising machine readable code executable via a web browser or web-based application of the user device such that the detection script is configured to cause the user device to send feedback from at least one sensor on the user device that is accessible by the web browser or web-based application;
   receiving the feedback from the user device at a server and evaluating the feedback from the at least one sensor on the user device;
   obtaining location information for the user device; and
   calculating a trustworthiness factor for the user device based on the evaluation of the received feedback from the user device and the obtained location for the user device.

2. The method of claim 1 further comprising obtaining web browser or web based application information from a document object model of the web browser or web based application from the user device.

3. The method of claim 2 further comprising setting elements in the document object model wherein the feedback from the at least one sensor is evaluated and compared to expected values based on the elements set in the document object model.

4. The method of claim 2, wherein the at least one sensor comprises an accelerometer, a gyroscope, and a magnetometer, and the feedback is evaluated and compared to expected values based on the document object model.

5. The method of claim 1 wherein the at least one sensor comprises an accelerometer, a gyroscope, and a magnetometer, and the feedback is evaluated for a presence of an active user of the user device.

6. The method of claim 5, wherein the active user is detected when accelerometer, gyroscope, and magnetometer data match expected values based on a history of values for users of the requested content.

7. The method of claim 1, wherein obtaining location information comprising
   providing a tracking script on the detection script that generates a unique URL;
   receiving a request for an IP address associated with the unique URL at a DNS resolver server from a DNS server upstream from the user device; and
   correlating the user device with a geographic location of the DNS server upstream from the user device and a geographic location of the DNS resolver server in a database.

8. The method according to claim 7, further comprising receiving a communication from the user device and comparing an expected communication time based on a geographic location of the DNS resolver server and an actual communication time.

9. The method according to claim 7, further comprising tracking a number of the received requests at the DNS resolver server from the user device.

10. The method of claim 9, further comprising decreasing the trustworthiness factor of the user device when the number of the received requests exceeds a predetermined amount in a predetermined time interval.

11. The method according to claim 7, wherein the DNS resolver server is one of a plurality of DNS resolver servers with a same anycast destination address.

12. The method according to claim 11, wherein information received at the plurality of DNS resolver servers is stored on a logging server.

13. The method according to claim 7, wherein Internet traffic generated from the user device is mapped based on the geographic location of the upstream DNS server and the geographic location of the DNS resolver server.

14. The method according to claim 1, further comprising obtaining velocity and dwell time information from the user device and comparing it to historical velocity and dwell time information of users requesting the content.

15. A system for evaluating the trustworthiness of online transactions, the system comprising:
   a source server that provides a detection script to a content delivery server, the detection script being presented to a user device alongside content requested by the user device and hosted by the content delivery server, the detection script comprising machine readable code executable on a web browser or web-based application of the user device and configured to cause the user device to send feedback from at least one sensor on the user device that is accessible by the web browser or web-based application;
   a detection server that receives the feedback from the user device and evaluates the feedback from the at least one sensor on the user device, that obtains location information for the user device, and that calculates a trustworthiness factor for the user device based on the feedback and the location for the user device.

16. The system of claim 15, further comprising:
   a DNS resolver server that is configured to receive a unique URL generated from the detection script;
   the DNS resolver server receiving the unique URL in a request from an upstream DNS server for an IP address corresponding to the unique URL, and the DNS resolver server correlating the user device to a geographic location of the upstream DNS server as the location information for the user device.

17. The system of claim 16, wherein the DNS resolver server receives a communication from the client device and compares an expected communication time based on a reported geographic location of the user device and an actual communication time.

18. The system of claim 16, wherein the DNS resolver server tracks a number of the received requests at the DNS resolver server from the user device.

19. The system of claim 18, wherein the DNS resolver server is one of a plurality of DNS resolver servers with a same anycast destination address.

20. The system of claim 15, wherein
the detection script is configured to cause the user device to send web browser or web based application information from a document object model of the web browser or web based application from the user device to the detection sever, and to set elements in the document object model, and
the feedback from the at least one sensor is evaluated and compared to expected values based on the set elements in the document object model.

* * * * *